United States Patent [19]

Chesney, Jr. et al.

[11] 4,447,267

[45] May 8, 1984

[54] DRY SET GROUT

[75] Inventors: Joseph J. Chesney, Jr., Plainsboro; Scott C. Broney, Trenton, both of N.J.

[73] Assignee: Tile Council of America, Inc., Princeton, N.J.

[21] Appl. No.: 311,163

[22] Filed: Oct. 14, 1981

[51] Int. Cl.$^3$ ............................................. C04B 7/353
[52] U.S. Cl. ........................................ 106/93; 106/97
[58] Field of Search ............................... 106/93, 97

[56] References Cited

U.S. PATENT DOCUMENTS

| T948,009 | 7/1976 | Greminger | 106/93 |
|---|---|---|---|
| 2,820,713 | 1/1958 | Wagner | 106/93 |
| 2,838,411 | 6/1958 | Wagner | 106/93 |
| 4,021,257 | 5/1977 | Bernett | 106/93 |
| 4,043,827 | 8/1977 | Bernett | 106/93 |
| 4,069,062 | 1/1978 | Burge | 106/93 |
| 4,330,441 | 5/1982 | Bohmer et al. | 106/90 |
| 4,363,667 | 12/1982 | Birchall et al. | 106/93 |
| 4,402,752 | 9/1983 | Chesney | 106/93 |

*Primary Examiner*—Helen M. McCarthy
*Attorney, Agent, or Firm*—Morgan, Finnegan, Pine, Foley & Lee

[57] ABSTRACT

A dry-set Portland cement based grout composition having less than 75% by weight of Portland cement, filler, bentonite clay, and no more than about 0.35% by weight of a composite of a cellulose ether and a long chain polymer such as polyacrylamide.

4 Claims, No Drawings

DRY SET GROUT

BACKGROUND OF THE INVENTION

1. Field of the Invention

This invention relates generally to cementitious compositions. More specifically, this invention relates to Portland cement compositions particularly suitable for use as pointing compounds, more commonly known as tile grout.

2. Description of the Prior Art

In the setting of ceramic tile, it is now an established practice to fill the areas or joints between the adjacent tiles with a bonding material. The material used to fill the joints is referred to as pointing compound or, as it is more commonly known, tile grout. A variety of tile grout compounds presently exist, e.g., acrylic grout, epoxy grout and Portland cement base grout.

All tile grouts, regardless of the type, are required to provide certain properties. These properties include workability, stain resistance and easy cleanup. Workability is required to facilitate the spreading of the grout completely into the joints beteen the adjacent tile edges without creating any vacant areas. Workability is particularly significant in dry set Portland cement tile grouts because the composition is typically packaged as a dry powder that must be mixed with water to a workable consistency at the job site.

The property of stain resistance is important because ceramic tile is used both functionally and decoratively. Thus, permanent stains on either the ceramic tile or the grout will mar and detract from the decorative appearance of the installation. The face of the ceramic tile is essentially impervious and, therefore, free from permanent staining. The grout must be made both as resistant to stain and capable of withstanding scouring as possible.

Easy cleanup is another important property of grout due to the nature of the way in which tile grout is installed. Tile grout must be installed after the ceramic tile is firmly set. Thus, when troweled into the joints between the ceramic tile edges, some of the excess grout will adhere to the tile face. The grout must be removed from the tile face without disturbing the grout in the joints.

A property particular to Portland cement dry set grout is the capacity to retain water after troweling. Water retention is desirable in Portland cement grouts because the ceramic tile bisque and the substrate on which the tile is set tend to absorb water from the grout. Portland cement requires water to properly set; thus, removal of water from a Portland cement grout prevents the grout from properly curing.

At present, dry set Portland cement grout is a grout commonly used to fill the joints between the coarse edges of ceramic tile that has been dry set. A dry set Portland cement grout normally is made up of Portland cement, a filler such as fine limestone or marble dust, and a cellulose ether such as methyl cellulose or hydroxyethyl cellulose. Illustrative of dry set Portland cement grouts are the grouts disclosed in U.S. Pat. No. 2,820,713 (Wagner, issued Jan. 21, 1958) and U.S. Pat. No. 2,838,411 (Wagner, issued June 10, 1958). More recently, an improved dry set grout has been developed at Tile Council of America, Princeton, N.J., in which a long chain organic polymer is used as an ingredient. The specific detail of both the grout and mortar compositions having a long chain organic polymer as an ingredient are disclosed in U.S. Pat. Nos. 4,021,257 (Bernett, May 3, 1977) and 4,043,827 (Bernett, Aug. 23, 1977). Therein, the dry set grouting composition is disclosed as a composition comprised of 75% to 100% Portland cement, 0% to 25% filler, such as limestone, 0.1% to 0.6% of a cellulose ether and 0.001% to 0.2% of a long chain organic polymer. Illustrative long chain organic polymers are hydroxyalkyl starch and polyacrylamide.

SUMMARY OF THE INVENTION

It is the object of the present invention to provide an improved pointing composition or grout known as a dry set grout.

It is a further object of the present invention to provide a dry set grout which has a balance of cellulose ether, polyacrylamide and clay to afford proper body and consistency to the composition without requiring the normal quantity of cement.

It is also an object of this invention to provide a dry set grout that has an increased capacity to maintain water after troweling, has excellent stain resistance and which affords easy cleanup.

It is also an object of this invention to provide a dry set grout which can be filled with inorganic fillers (i.e., ground limestone) up to 50% and still provide the performance characteristics normally only associated with low filler ratio grouts.

It is another and further object of the present invention to provide a dry set grout having equivalent or better over-all properties than previously known dry set grouts, but which can be provided at a lower cost.

It is a still further object of the invention to provide one alternative embodiment of dry set grout that meets the above objectives with a composition that does not include any hydrated lime.

Thus, the tile grout composition of the present invention contains about 40% by weight limestone, about 58-59% by weight Portland cement, 0.35% by weight of, for example, Dow Chemical XD30542.00 (a cellulose ether-polyacrylamide composite) and 0.15% by weight Bentonite clay. Urea, in the range of about 0.05%, by weight and hydrated lime, in the range of about 1.00% by weight, are optional ingredients.

DESCRIPTION OF THE PREFERRED EMBODIMENT

The preferred embodiment of the present invention is an improved tile grout composition over the previous Tile Council of America Inc. grout development explained in detail in U.S. Pat. Nos. 4,021,257 (Bernett, May 3, 1977) and 4,043,827 (Bernett, Aug. 23, 1977).

The grout composition of the present invention is comprised of essentially the same ingredients as the previous grout developed by Tile Council of America, i.e., Portland cement, filler (limestone), Bentonite clay, cellulose ether and polyacrylamide. However, the grout composition achieves equivalent and improved grout properties by virtue of a balance of the ingredients heretofore unknown.

The particular grout composition of this invention provides among other equivalent or improved properties, better workability, increased stain resistance and simplified cleaning over previously known Portland cement based grouts, all at a lower cost.

The ranges of the various ingredients that provide the improved grout are:

made in accordance with this invention (Examples 10–14).

TABLE I

| Example | Portland cement | Limestone | Composition Fumed Silica | Composition XD30542.00[1] | Methyl Cellulose K4m | Bentonite Clay | Hydrated Lime | UREA |
|---|---|---|---|---|---|---|---|---|
| 1 | 88.45 | 10.00 | | | 0.5 | | 1.00 | 0.05 |
| 2 | 78.45 | 20.00 | | | 0.5 | | 1.00 | 0.05 |
| 3 | 68.45 | 30.00 | | | 0.5 | | 1.00 | 0.05 |
| 4 | 58.45 | 40.00 | | | 0.5 | | 1.00 | 0.05 |
| 5** | 84.45 | 10.00 | | | 0.5 | | 1.00 | 0.05 |
| 6* | 60.00 | 34.37 | | | 0.5 | | 1.00 | 0.05 |
| 7 | 64.00 | 34.00 | 0.45 | | 0.5 | | 1.00 | 0.05 |
| 8 | 63.55 | 34.00 | 0.90 | | 0.5 | | 1.00 | 0.05 |
| 9 | 58.45 | 40.00 | | | 0.5 | | 1.00*** | 0.05 |
| 10 | 58.45 | 40.00 | | 0.35 | | 0.15 | 1.00*** | 0.05 |
| 11 | 58.45 | 40.00 | | 0.35 | | 0.15 | 1.00 | 0.05 |
| 12 | 58.95 | 40.00 | | 0.35 | | 0.15 | 0.05 | 0.05 |
| 13 | 63.45 | 35.00 | | 0.35 | | 0.15 | 1.00 | 0.05 |
| 14 | 68.45 | 30.00 | | 0.35 | | 0.15 | 1.00 | 0.05 |

*includes 0.08 Colloids 770DD
**includes 4. TiO$_2$ (2020)
***Jiffy soak lime
[1] about 57 parts of methyl cellulose to 1 part polyacrylamide

| | |
|---|---|
| Portland cement | 50–75% by weight |
| filler | 25–50% by weight |
| XD 30542.00 (a cellulose ether-polyacrylamide composite) | about 0.35% by weight (± 0.10%) |
| Bentonite clay | about 0.15% by weight (± 0.05%) |

When hydrated lime or urea is used in the composition, their percentages by weight in the composition are approximately 1.00 and 0.05, respectively. These latter two ingredients are substituted directly for cement.

The balance of properties is best achieved by reducing the Portland cement content from the 75% to 99% range to below 60% and using a cellulose ether and polyacrylamide in a combination of about 40–70 parts of cellulose ether, e.g. methyl cellulose to 1 part polyacrylamide. With this critical combination the more expensive ingredients, i.e. cellulose ether, polyacrylamide and Portland cement are maintained at a minimum.

The following examples shown on Table I reveal prior art composition (Examples 1–8) and compositions The ingredient XD30542.00 is a Dow Chemical Co. product made of from 0.0085 to 0.0146 parts by weight polyacrylamide (SEPARAN AP273) and 0.5854 to 0.5915 parts by weight methyl cellulose (METHOCEL K4M).

The limestone used in each of the examples is SNOWFLAKE limestone (Thomson & Weinman). The methyl cellulose of Examples 1–8 is Dow Chemical K4M. The Bentonite clay of Examples 10–14 is THIXOJEL #3 (Georgia Kaolin).

The hydrated lime used for Examples 1–8 and 11–14 is RED-TOP LIME-TYPE N.

It is to be noted that equivalent materials to the ingredients set forth in Examples 10–14 are, of course, contemplated by the invention and are within the purview of the invention.

Each of the grout compositions of the Examples have been tested for various properties, important to grouts. The results are reported in Table II.

TABLE II

| Example | Properties Density | Properties Shrinkage | Compressive Strength (1 wk) | Staining M | Staining I | Staining C | Elastic Modulus | Water Retention | Rheology and chalking |
|---|---|---|---|---|---|---|---|---|---|
| 1 | 1.77 | none | 5935.5 | VS | VS | VS | 3.06 | — | no chalking; easy to trowel; smooth, creamy |
| 2 | 1.75 | none | 5125 | O | VS | O | 4.87 | — | no chalking; easy to trowel; smooth, creamy |
| 3 | 1.75 | none | 4750 | S | VS | VS | 2.55 | — | no chalking; easy to trowel; smooth, creamy |
| 4 | 1.73 | none | 4000 | O | VS | O | 3.95 | 18.65 | no chalking; easy to trowel; smooth, less creamy |
| 5 | 1.77 | none | 5025 | VS | M | VS | 4.388 | — | no chalking; good troweling; less smooth; stickier |
| 6 | 1.81 | none | 4100 | S | M | O | 4.375 | — | chalked slightly when troweled; slightly lumpy; easy to trowel |
| 7 | 1.74 | none | 4437.5 | O | M | O | 4.196 | — | chalked more than Ex. 6 when troweled; easy to trowel; slightly lumpy |
| 8 | — | none | — | S | S | O | — | — | — |
| 9 | 1.71 | none | 3708 | S | O | O | 3.35 | 18.11 | smooth; creamy; very easy to trowel; dried when applied to tile; minimal powder |
| 10 | 1.81 | none | 3750 | S | O | O | 4.16 | 16.14 | smooth and creamy; very easy to trowel; thicker with more body than Ex. 9; no dry out; minimal powder |
| 11 | 1.81 | none | 4417 | VS | O | O | 5.75 | 18.89 | smooth; creamy; very easy to trowel; minimal powder; no "dry out" |
| 12 | 1.79 | none | 4833 | VS | O | O | 4.97 | 14.96 | smooth; creamy; easy to trowel; minimal powder |

TABLE II-continued

| Example | Properties | | Compressive Strength (1 wk) | Staining | | | Elastic Modulus | Water Retention | Rheology and chalking |
|---|---|---|---|---|---|---|---|---|---|
| | Density | Shrinkage | | M | I | C | | | |
| 13 | 1.79 | none | 4500 | VS | O | O | 6.14 | 14.17 | smooth; creamy; easy to trowel; few small lumps; minimal powder |
| 14 | — | none | — | VS | O | O | — | — | — |

The test for compressive strength consists of the formation of 131.1 cm³ cubes. Three cubes were formed from each composition, and allowed to stand for one week. After the week all three cubes were subjected to increased compressive force until broken. The average of the force required to break each of the cubes is shown on Table II.

The test for determining elastic modulus consists of forming 131.1 cm³ cubes. The cubes are supported along the opposite edges of one cube face and subjected to a force imposed along the center line of the opposite face. The deflection of the cube is measured by a Tinius Olsen at the point just prior to failure of the cube, and the force required to cause the failure is recorded. The elastic modulus recorded on Table II is the average of 3 tests obtained by the following formula:

$$\frac{10 \times \text{Difference in load between } t_1 \text{ and } t_2 \frac{1}{1000} \text{ lbs.}}{2 [\text{deflection (in.)} \times 10^{-4}]}$$

in which $t_1$ is a point along the slope of the first loading frame representing a coordinate of the x and y axis of a deflection in inches and load in pounds, respectively, and $t_2$ represents a coordinate within the same x and y axis, but is taken along the slope of the second loading frame.

Deflection in inches is the horizontal measurement between the points, $t_1$ and $t_2$. Whereas, the difference in load is measured using the vertical difference between $t_1$ and $t_2$.

The test for staining is measured by staining the hardened grout with coffee (C), ink (I) and mustard (M) respectively, blotting the stain after three minutes, then damp toweling and finally by scrubbing with Ajax cleanser. The values are reported on Table II in terms of H (heavy stain), S (slight stain), M (moderate), VS (very slight) and O (no stain).

The density reported on Table II is obtained by filling a cup with the grout, subtracting the weight of the full cup from the weight of the empty cup, i.e., 1520 gm−841 gm, and dividing the net weight by the volume of the cup.

Water absorption, as reported on Table II, is obtained by casting the grout sample, allowing the sample to harden, weighing the hardened sample, boiling and then soaking the sample. The figure reported is the weight of the sample after soak less the weight of the hardened dry sample divided by the weight of the hardened dry sample.

Rheology and chalking are properties that are measured visually. The observations relating to rheology and chalking are reported on Table II.

The test for shrinkage of a grout occurs by casting grout in a bar and allowing the bar to settle overnight. Visual observation of the bar of grout is made 24 hours later, and, if cracks do not appear, the conclusion is that shrinkage has not occurred. Shrinkage bars are cast in the form of rectangles 15.24 cm×2.54 cm×0.635 cm.

The comparative data reveal that the state of the art grouts of Examples 1 through 8 have properties no better than and, in many respects inferior to the grouts of Examples 10, 11, 12 and 13. The grouts of Examples 1, 2 and 5 are the grouts heavily loaded with Portland cement and resemble the current state of the art Portland cement-based grouts. The grouts of Examples 10, 11, 12, 13 and 14 are the grouts of the present invention.

By comparison it can be seen that the density of the grouts of the current invention is the same or better than that of the state of the art grouts. Similarly, the grouts of the present invention and the state of the art grouts show no shrinkage. Compressive strength of the state of the art grouts is somewhat better than the compressive strength of the grouts of the present invention, however, both satisfy the compressive strength requirements for Portland cement based grouts. The modulus of elasticity for the grouts of the present invention is superior to the modulus of elasticity of the state of the art grouts. Water retentivity is approximately the same, and the stain resistance of the grouts of the present invention is about the same or better than the stain resistance of the state of the art grouts.

The rheology and chalking observation indicate that the grout of the invention is superior in workability, and ease of clean-up to the state of the art grouts.

It should be understood by those skilled in the art that various modifications may be made in the present invention without departing from the spirit and scope thereof as described in the specification and defined in the appended claims.

What is claimed is:

1. In a dry-set grout composition adapted to be mixed with water to a workable consistency, containing Portland cement, filler, bentonite clay, a cellulose ether and polyacrylamide, the improvement comprising the use of less than about 60% but more than 50% Portland cement, from 25% to 50% of filler, about 0.15% bentonite clay, and not more than about 0.35% of a composite of a cellulose ether and polyacrylamide whrein the ratio of said cellulose ether to polyacrylamide is between 40 and 70 to 1, the resulting composition characterized by improved workability, stain resistance and cleaning properties over previously employed Portland cement based grouts.

2. A dry set grout as in claim 1 further comprising hydrated lime.

3. A dry set grout as in claims 1 and 2 further comprising urea.

4. A dry set grout as in claims 1 and 2 wherein the amount of Portland cement is about 58.45% by weight; the filler is limestone and the amount of filler is about 40% by weight.

* * * * *